May 12, 1964 H. C. WOHLFERTH ETAL 3,133,217
COMPOSITE LAMINATED MICA MAT-MICA FLAKE COMMUTATOR CONES
Filed July 31, 1961
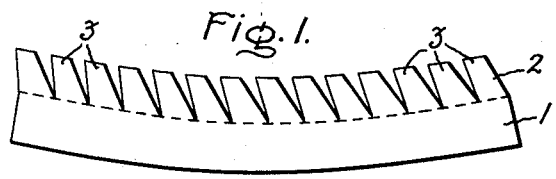
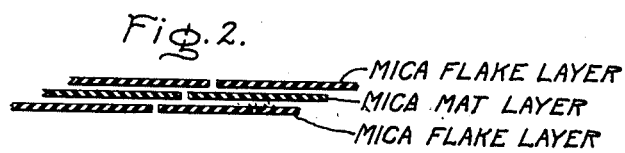
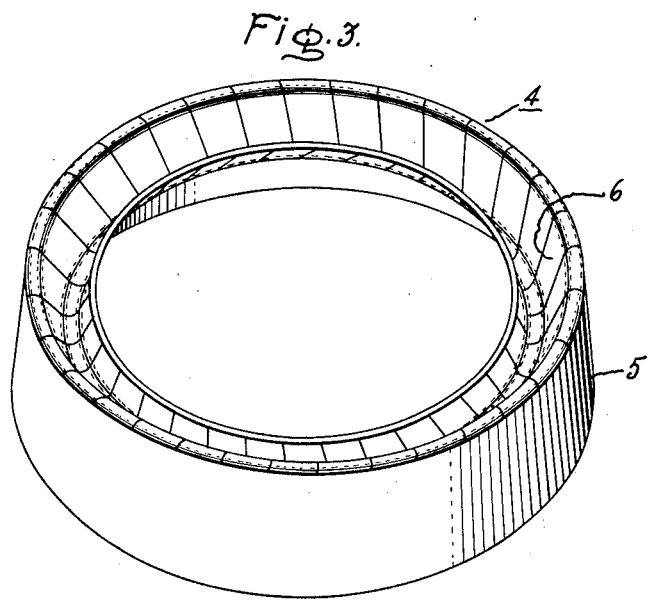
Inventors:
Harry C. Wohlferth,
Donald C. Stavely,
by
Their Attorney 3,133,217
COMPOSITE LAMINATED MICA MAT-MICA FLAKE COMMUTATOR CONES
Harry C. Wohlferth, Berkeley Heights, N.J., and Donald C. Stavely, Scotia, N.Y., assignors to General Electric Company, a corporation of New York
Filed July 31, 1961, Ser. No. 127,964
5 Claims. (Cl. 310—233)

This invention relates to commutator insulating cones or V-rings for electrodynamic machines and to the production of such insulating cones.

A commonly accepted process for preparing commutator cones for electrical machinery comprises pressing in a suitable mold one or more layers of mica flake laminates which are bound together with thermosetting resins. Particularly in the larger size cones, a plurality of laminate blanks are arranged in staggered butt, or otherwise adjoined fashion in the pressing mold, in order to provide moldability and save material which would be wasted if single laminate blanks were used.

It is very important that the final commutator cones be uniform in physical and electrical properties, and it is therefore equally important that the mica flake laminates from which the cones are fabricated be likewise possessed of such favorable qualities. In preparing mica flake laminates, it is usual to lay down the mica flakes coated with a suitable thermosetting resinous material to the desired thickness, after which the laminates are pressed under heat and pressure between platens to form sheets from which the commutator cone segments or blanks are cut. Despite the care with which such mica flake laminates are prepared there inevitably occur therein so-called "resin pockets" which consist largely of resin and, likewise, areas having a deficiency of resin and a surfeit of mica flakes, resulting in so-called "high spots." Each of these conditions is avoided whenever possible because of its unfavorable effect upon the final commutator cone. For example, commutator segments which bear against a V-slot commutator cone portion which has an excess of resin will, because of the relatively low physical resistance of the resin, tend to imbed themselves in or even puncture the resin pocket, resulting in undesired movement of the commutator segments and possible failure of the electrodynamic machine as a result. Under the same circumstances, high spot areas consisting mostly of mica and little resin tend to crush producing points susceptible to electrical failure.

Generally speaking, the so-called "areas of mica flake over-abundance" or "high spots" are removed when the rough mica flake laminate is sanded or milled to its final relatively smooth condition. At times, up to 20 percent of the original thickness of the laminate is thus removed, as by sanding, to smooth out the laminate and reduce mica high spots. However, even though such high spots may be physically removed by such uneconomical removal of up to 20 percent of the laminate thickness, there still remains throughout the laminate thickness at some spots a surfeit of mica which, when the laminates are pressed in the final mold to form the commutator cone, has a tendency to crush, seriously affecting and lowering the electrical properties of the commutator cone at that spot. It will be appreciated that the insulating qualities of the commutator cone as a whole are no better than at its weakest point. If excessive crushing of the mica takes place due to the so-called "high spots," the commutator cone will tend to fail, if not during the actual molding of the commutator cone itself, at a later time under the relatively large pressures exerted when the commutator segments themselves are fixed in place and a potential difference is imposed across the cone thickness.

From the above, it will be quite apparent that there is a definite need for commutator cones which are so constructed that the so-called "mica high spots" may be compensated for in large degree without excessive milling or sanding, or removal of relatively large quantities of the mica flake laminate used in the commutator cone.

A principal object, therefore, of this invention is to provide commutator insulating cones for electrodynamic machines which are very simply made and which overcome deficiencies caused by uneven distribution of mica flake material within the laminates making up the cone.

Briefly stated, the invention relates to commutator insulating cones which are made up of thermosetting, resin impregnated, mica flake laminate layers separated by layers of resin impregnated mica mat material. The mica mat serves as a cushion, which prevents the crushing of the mica flake material in the mica-flake laminate layers, to provide a final insulating structure of superior dielectric and physical characteristics.

Those features of the invention which are believed to be novel are set forth with particularity in the claims appended hereto. The invention will, however, be better understood and further objects and features thereof appreciated from a consideration of the following description and the drawing in which FIG. 1 is a segment of laminate which is typical of those used in the preparation of such commutator cones, FIG. 2 is a cross-sectional, exploded edge view of a portion of the commutator cone segment of FIG. 1 showing the manner in which the laminate segments making up the cone are arranged, and FIG. 3 is a perspective view of a commutator cone prepared according to the present invention.

The mica mat or mica paper material used in connection with this invention is well known and is described, for example, in Bardet Patent 2,549,880, among others. Generally, the mica material is dehydrated at an elevated temperature of the order of about 800° C., after which the treated flakes are placed in a liquid medium wherein the flakes are broken up to form a pulp, which is then made into sheet material by conventional paper-making techniques. While the paper may be laid down and used in any desired thickness, paper having a thickness of about 0.004 inch has been found convenient for use in connection with this invention.

Another process for producing finely divided micaceous material suitable for preparing mica mat from either natural or synthetic mica is disclosed in copending application Serial No. 810,566, filed May 4, 1959, assigned to the same assignee as this invention and included herein by reference. There is described in this application the process of delaminating micaceous and similar material by coating the material with an adhesive and applying thereto a peeling force which is greater than the bonding force between the physical elements of the material. This process when applied repetitiously reduces the material to a very fine state. Upon removal of the adhesive, fine surface-active platelets are produced which can be formed into a slurry from which in turn mica mat may be prepared by usual paper-making methods. The paper is impregnated with any of the thermosetting resins useful for such purpose.

Generally speaking, any of the usual thermosetting resins or varnishes used in electrical insulating materials can be used in connection with the invention, including natural and synthetic shellac, alkyd resins, both modified and unmodified, epoxy resins, polyesters, polysiloxane materials, polyurethanes, melamine resins, and others. Various alkyd resin-containing compositions which are useful in the practice of the present invention are described, for example, in U.S. Patents 2,319,780 and 2,319,826, assigned to the assignee of the present invention, describing respectively alkyd resin and polyvinyl ester compositions and reaction products of endomethylenetetrahydrophthalic anhydride and polyhydric alcohol blended with polyvinyl acetate. The mica mat materials used in the present invention are impregnated with the thermosetting resin and then dried at a temperature of about 110° C. for about four minutes before further use.

The mica flake laminates are prepared by laying down layers of flake mica which are coated with the desired thermosetting resin until it has reached a desired thickness. The laminate so laid up is dried typically at a temperature of 160° C. to 170° C. for four minutes after which sheets are pressed therefrom at a temperature of at about 180° C. and a pressure of 100 p.s.i. applied for from about 15 to 20 minutes as required. After the mica laminates are thus prepared, they are sanded as described above to remove high spots therefrom, in general, an average of about three to four mils of material being so removed to leave a laminate which is typically 23 mils in average thickness.

Next, segments which are roughly the size and shape of the final segments to be used in molding the commutator ring are cut. The desired number of roughly shaped, impregnated and dried layers of mica mat are then sandwiched between two layers of the rough mica flake segments and preformed in a mold having the approximate shape of the final mold, such preforming being carried out at a temperature of from 100° to 125° C. under a force of 5 to 10 tons. After preforming, the composite laminate is removed from the mold, the edges cut to final dimension and shape, and the three layers, two of mica flake laminate and one of mica mat, separated. Normally a non-adhering type of paper or film is used between the layers to facilitate such separation. In preparation for final molding of the commutator ring, the inner mica flake laminate segments are butt-joined using the proper number of segments to form the complete periphery of the commutator cone. Then, in succession, the mica mat segments are butt-joined in place and then the outer layer of mica flake segments, care being taken that each successive butt joint is offset from the other in the manner shown in FIG. 2. Final molding of the ring is carried out in a mold suitably shaped to the final size and shape of the commutator ring. Such molding is carried out under forces of from 15 to 150 tons, depending on the size and thickness of the commutator ring. Usually temperatures of from about 165° C. to 175° C. and times of 15 minutes to one hour are used, although it will be appreciated that all of these parameters will vary, depending upon the particular thermosetting resin used.

The following example illustrates the practice of the invention and is not to be taken as limiting in any way.

Mica flakes coated with a composition comprising a 15 percent solid solution of the reaction product of nadic anhydride and glycerin, the reaction product of maleic anhydride, pentaerythritol blended with polyvinyl acetate in a 15 percent solid solution using as a solvent toluene and ethyl alcohol were laid up to an average thickness of about 26 mils, dried for four minutes at 160° C. to 170° C. and then pressed into sheets at a temperature of from 180° C. and 100 p.s.i. for 15 to 20 minutes. The rough sheets so prepared were sanded to remove major irregularities or high spots, an average of about three to four mils being removed from the laminate as compared to about 6 mils of removed material for typical prior art laminates. The laminates were then cut into segments having roughly the shape of the segments shown in FIG. 1 having a skirt portion 1 and a V-slot portion 2, the latter of which is typically in many cases cut into fingers as shown at 3 to facilitate forming the inner portion of the V-slot. It will be realized, of course, that the fingers 3 can be omitted in some cases and in still other cases segments of larger or even less relative size and proportions than those shown in FIG. 1 may be prepared. It will also be appreciated that in some instances, particularly where the commutator cone is rather small and the laminate rather thick, the cone can be molded from a single blank instead of from segments as shown.

After the mica flake laminates were roughly cut to size, a preheated sandwich structure consisting of two such roughly cut segments having therebetween eight layers of four-mil thick mica mat impregnated with the same resin was placed in a preforming press having the approximate size and shape of the final commutator cone and pressed at 100° C. under a force of 10 tons for five minutes. After preforming, the composite segments were trimmed to size and separated into the respective mica flake laminate layers and mica mat layers. Next, the requisite number of mica flake and mica mat segments to form the entire commutator cone were butt-joined as above, care being taken that such butt joints were staggered in each succeeding laminate layer in the fashion shown in FIG. 2. In preparing the final commutator cone, the so suitably shaped, butted segments of mica flakes and mica mat were once again laid in a mold and pressed under a force of 50 tons at a temperature of about 165° C. to 175° C. for approximately 45 minutes to produce the final desired article.

In lieu of three layers of laminate material, multiple layers of mica mat laminate interleaved with mica flake laminate can also be employed for the internal structure of the cone along with exterior layers of mica flake laminate.

The commutator cone so made and shown in FIG. 3 having a skirt portion 5 and a V-slot portion 6 exhibited an exceptionally smooth surface, there being no sign of crushed mica high spots. This is believed due to the cushioning effect of the mica mat interlayer which tends to flow away from such high spots as well as cushioning and tending to take up in general the inequalities in the mica flake laminate layer portions. Commutator cones so prepared are characterized by exceptional smoothness and uniform thickness, this smooth state being attained without the excessive sanding which was heretofore necessary. Under high potential tests, it was found that generally commutator cones about one-sixteenth inch thick made according to the present invention withstood potentials of up to 18,000 volts without dielectric failure. On the other hand, excessive failures occur even at potentials of 12,000 volts with cones made by prior art methods.

There are prepared then by the present invention commutator cones which are not only much simplified in the making thereof but which are characterized by highly desirable smoothness and absence of weakening resin spots and high spots. The uniformity so attained permits greatly lengthened life of commutator cones made therewith in that being of such uniform characteristics, they do not tend to have or develop weak spots at which they fail, thus destroying the commutator structure in general. Furthermore, they are characterized by superior electrical qualities.

While the invention has been described particularly with respect to commutator cones, it will be realized that those skilled in the art will find other uses for laminates of the type described in which advantage of its particular structure may be taken and it is the intent to cover all such structures which do not depart from the spirit and scope of the claims appended hereto.

What we claim as new and desire to secure by Letters Patent of the United States is:

1. A thermoset resin impregnated commutator cone comprising two layers of mica flake laminate having therebetween a layer of mica mat laminate, each layer of laminate consisting of a plurality of butt-joined segments, such segments being so arranged that the joints in any one layer are offset from the joints in the adjoining layer.

2. A commutator cone comprising a plurality of segmented layers of insulating material arranged in offset, superimposed fashion, including two layers of mica flake laminate having therebetween a mica mat layer, the whole being impregnated and bonded together with a thermosetting resin.

3. A resin bonded commutator cone comprising a plurality of composite laminate layers, each layer comprising a first layer of mica flake laminate, a second layer of mica mat superimposed on said first layer and a third layer of mica flake superimposed on said mica mat layer.

4. A commutator cone comprising outer layers of mica flake laminate and alternate inner layers of laminated mica flake and laminated mica mat, the whole being impregnated and bonded together with thermosetting resin.

5. A commutator cone comprising outer layers of segmented butt-joined mica flake laminate and alternate inner layers of segmented butt-joined mica flake laminate and mica mat laminate, the joints of successive layers being offset and the whole impregnated and bonded with a thermoset resin.

References Cited in the file of this patent

UNITED STATES PATENTS

| | | |
|---|---|---|
| 1,857,586 | Coffey | May 10, 1932 |
| 2,363,324 | Hill | Nov. 21, 1944 |
| 2,454,210 | Runk et al. | Nov. 16, 1948 |
| 2,880,336 | Wohlferth | Mar. 31, 1959 |

FOREIGN PATENTS

| | | |
|---|---|---|
| 535,654 | Canada | Jan. 8, 1957 |